June 27, 1950  W. R. MacCLUNEY  2,513,245
RELEASING GEAR
Filed April 16, 1945  3 Sheets-Sheet 2
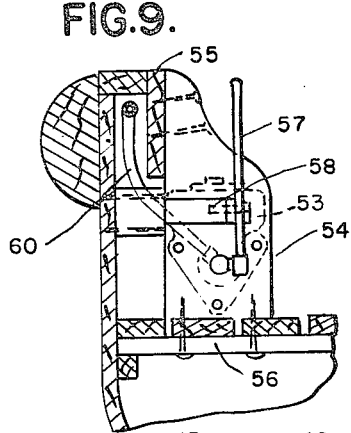
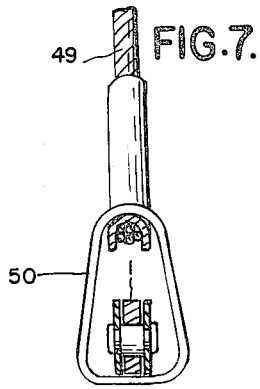
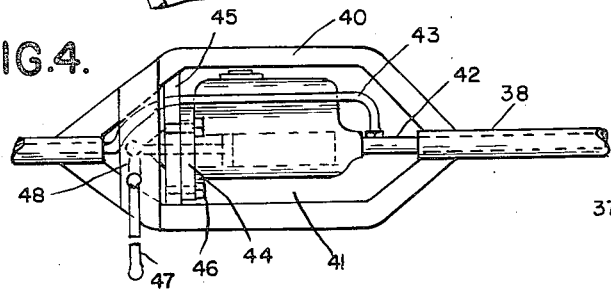
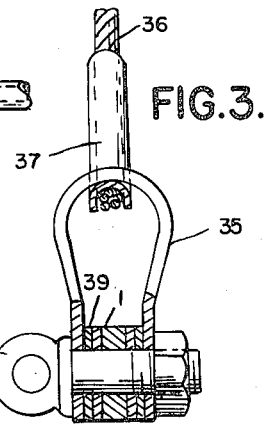
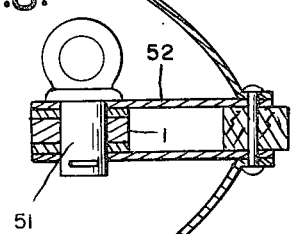
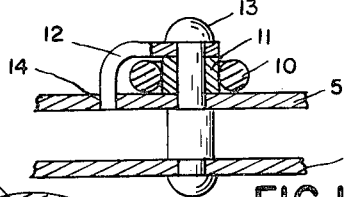
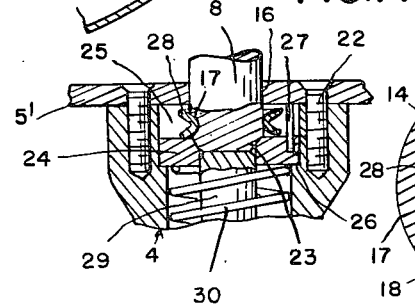
INVENTOR.
WILLIAM ROBERT MacCLUNEY
BY
ATTORNEYS

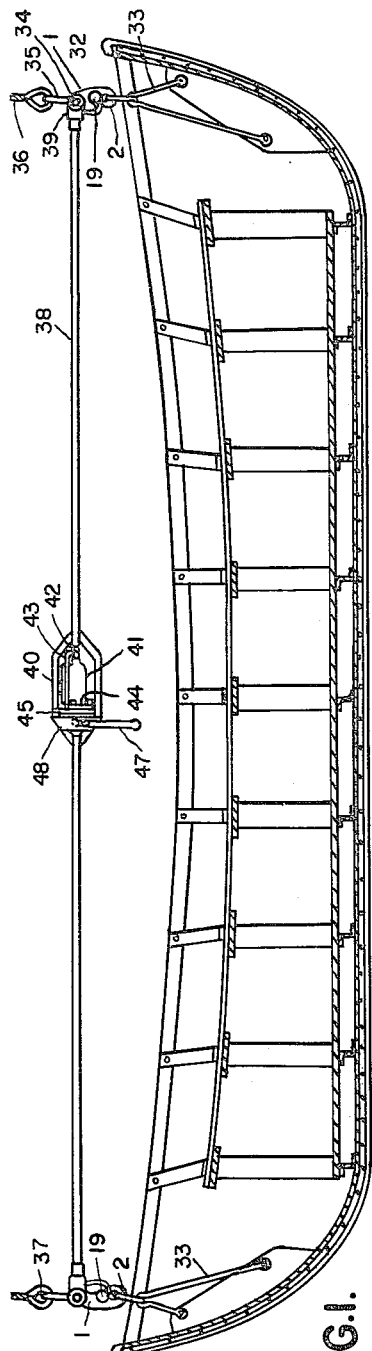

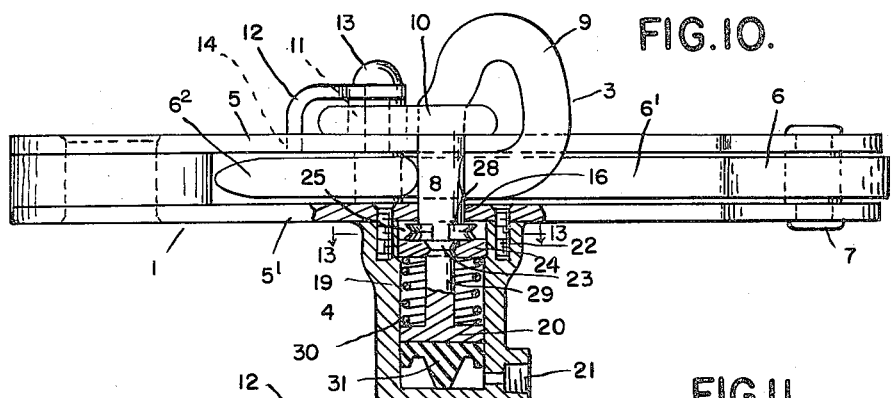
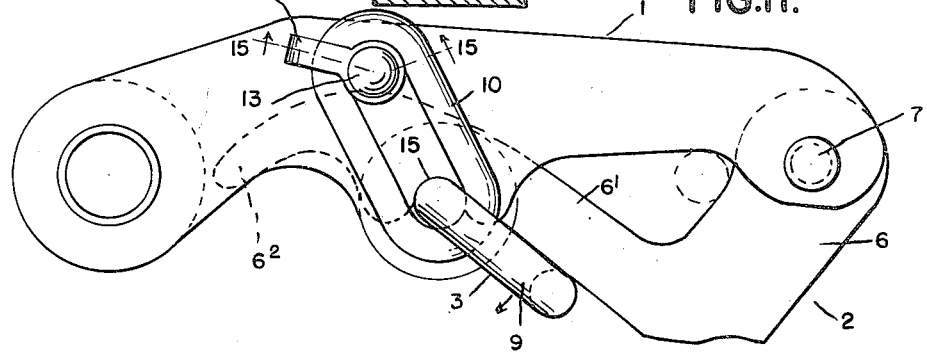
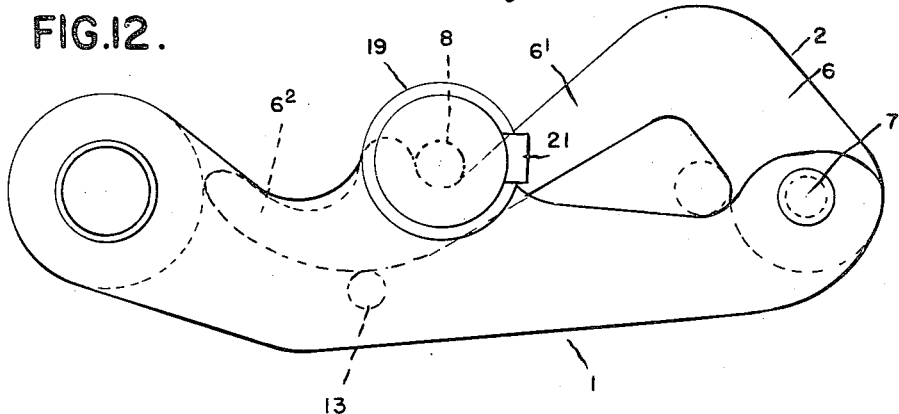

Patented June 27, 1950

2,513,245

UNITED STATES PATENT OFFICE 2,513,245

RELEASING GEAR

William Robert MacCluney, Dearborn, Mich.

Application April 16, 1945, Serial No. 588,575

5 Claims. (Cl. 294—84)

The invention relates to releasing gear and refers more particularly to marine releasing gear for boats, rafts, crates, cases, or the like.

The invention has for one of its objects to provide an improved marine releasing gear which is constructed to be hydraulically released.

The invention has for another of its objects to provide marine releasing gear comprising a plurality of hooks and to so construct the releasing gear that the hooks may be simultaneously or independently released.

The invention has for a further object to provide an improved hook which is provided with a keeper and a fluid pressure operated actuator for releasing the keeper.

The invention has for still other objects the novel features of construction and combinations and arrangements of parts as more fully hereinafter set forth.

In the drawings:

Figure 1 is a sectional view of a lifeboat suspended from cables by releasing gear embodying the invention;

Figures 2, 3 and 4 are enlarged views of portions of the releasing gear;

Figure 5 is a view similar to Figure 1 showing a modification;

Figures 6 and 7 are enlarged views of portions of the releasing gear;

Figures 8 and 9 are cross sections on the lines 8—8 and 9—9, respectively, of Figure 5;

Figure 10 is an edge elevation, partly in section, of a hook forming part of the releasing gear;

Figures 11 and 12 are opposite side elevations thereof;

Figure 13 is a cross section on the line 13—13 of Figure 10;

Figure 14 is a cross section on the line 14—14 of Figure 13;

Figure 15 is a cross section on the line 15—15 of Figure 11.

As illustrated, the releasing gear is designed particularly for use in life saving equipment and comprises hooks and mechanism for releasing the hooks. The hooks are alike and each, as particularly illustrated in Figures 10 to 15, inclusive, is a pelican hook comprising the frame 1, the curved member 2, the keeper 3 and the fluid pressure operated actuator 4. The frame 1 is formed of the substantially parallel bar members 5 and 5' fixedly secured together at their ends and the curved member 2 is a generally L-shaped member pivoted to the frame and movable to open and closed positions. The curved member has one arm 6 extending between the bar members 5 and 5' and journaled on the shoulder rivet 7 which fixedly secures corresponding ends of the bar members together. The other arm 6' of the curved member is adapted in the closed position of the curved member to extend between the bar members intermediate their ends. An eye at one end of the frame is formed by the bar members 5 and 5' and the arm 6 of the curved member 2 and a hole is formed in the opposite end of the frame, the eye and hole being adapted to receive means for securing the hook to the boat and the cable, as illustrated in the present instance. The arm 6' also has the extension $6^2$ is engageable by hand to provide increased leverage for swinging the curved member 2 to closed position.

The keeper 3 is formed with the bolt 8 and with the hand grip 9 and is movably secured to the frame 1 by the link 10 at the outer side of the bar member 5. Both the bolt 8 and the hand grip 9 are of circular cross section. The link extends around the spacer 11 and through the space formed by the spacer, the L-shaped retaining member 12 and the bar member 5. The spacer and retaining member are secured to the bar member 5 by the shoulder rivet 13 and the retaining member has a portion extending into the hole 14 of the bar member to hold the retaining member stationary. The spacer, rivet and retaining member effectively secure the link 10 to the frame, but permit movement of the link parallel to the adjacent bar member and also angularly relative to this bar member. Inasmuch as the hand grip 9 of the keeper cooperates with the bolt 8 to form an eye through which the link 10 extends, the keeper is thus effectively secured to the frame, but may have the necessary movement. It will be noted that the bar member 5 is formed in one edge with the recess 15 which opens laterally outwardly and is of a size to receive the bolt 8. The other bar member 5' is provided with the opening 16 in alignment with the recess 15 and of a size to receive the bolt 8. The keeper is adapted to be moved to effective position retaining the curved member 2 in closed position, at which time the material of the bar members bordering the opening 16 and the recess 15 and the link 10 cooperate to hold the keeper in position against the pressure exerted by the curved member and to transmit the force exerted by the arm 6' to the bar members. The shoulder rivet 13 also serves to limit the closing movement of the curved member. The free end of the keeper bolt is formed with the transverse notches 17 and 18 which in the operative position of the bolt are located beyond the adjacent bar member of the frame.

The fluid pressure operated actuator comprises the cylinder 19 and the piston 20 slidable within the cylinder. The cylinder is provided with a port 21 for the inlet and outlet of the fluid and has its open end abutting and secured to the bar member 5′ by suitable means, such as the screws 22. The free notched end of the keeper bolt extends in the operative position of the keeper within the cylinder 19 and has a tapered nose 23 which extends within the washer 24. The washer is located within the cylinder and held from rotation by substantially fitting an enlarged recess 25 having a wavy outline. The washer is held against the shoulder 26 of the cylinder by the pins 27 set into the washer and abutting the adjacent bar member 5′. 28 is a U-shaped spring detent within the cylinder and, more particularly, within the recess 25, this detent being between the washer 24 and the adjacent bar member and being held from angular movement or rotation relative to the cylinder by reason of its base engaging in one of the wavy portions of the recess. The detent is engageable with either the notch 17 or the notch 18, depending upon the angular position of the keeper relative to the frame, and the relative angular position of the keeper depends upon whether the hook is detachable from the cable or detachable from the boat. The piston 20 has the rod 29 which is formed with a tapered end extending into the washer 24 and abutting the free end of the keeper bolt 8 when the keeper is in its operative position. 30 is a coil spring encircling the rod 29 and abutting the washer 24 and piston 20 for resiliently urging the piston toward the closed end of the cylinder and 31 is a suitable sealing member abutting the piston and in the normal position of the piston also abutting the closed end of the cylinder to limit the movement of the piston toward the closed end of the cylinder.

In operation, it will be seen that when fluid under pressure is forced into the cylinder 19 through the port 21 it operates upon the sealing member 31 to move the piston 20 away from the closed end of the cylinder so that the piston rod 29 operates upon the keeper bolt 8 to disengage the same from detent 25 and move it out of the opening 16 in the bar member 5′. At this time, the keeper bolt is in released position and permits the swinging of the curved member 2 to open position to free the member which had extended through the eye formed by the arm 6 and the adjacent portions of the bar members. It will be noted that upon longitudinal movement of the keeper bolt 8 out of the opening 16 in the frame member 5′, the tapered end of the keeper bolt 8 is swung about the link 10 outwardly by pressure exerted by the arm 6′ and allows the curved member 2 to swing towards open positions.

The pelican hook, as described, is designed particularly as a part of the releasing gear of either Figure 1 or Figure 5, the hook being either detachable from the boat or detachable from the cable used in suspending the boat.

Referring to Figures 1, 2, 3 and 4, there is a pelican hook at each stem of the boat arranged with the curved member 2 pivoted to the lower end of the frame 1 and forming an eye which is engaged by the clevis 32 permanently secured to the boat by the strap 33. The upper end of the pelican hook has the hole for receiving the pin 34 which permanently secures the clevis 35 to the hook. A cable 36 is connected to the clevis by the thimble 37. 38 are pipes permanently connected to the clevises 39 through the furcations of which the pins 34 extend. These pipes are connected at their adjacent ends to the spaced pipes 40 carrying the fluid pressure producing device 41 having its outlet connected to the tubes 42 and 43 which extend through the pipes 38 and connect into the ports 21 of the actuator cylinders 19. As illustrated, the fluid pressure producing device is a master cylinder used in a hydraulic brake system of a motor vehicle, the master cylinder having the mounting flange 44 at one end. 45 is a plate carried by the pipes 40 to which the flange 44 is secured as by means of the bolts 46. The piston of the fluid pressure producing device is manually operable by the hand lever 47 which is pivotally mounted upon the plate 48 carried by the pipes 40, the hand lever also being pivotally connected to the piston rod of the fluid pressure producing device.

With this construction, it will be seen that the pelican hooks with their keepers and fluid pressure operated actuators, the fluid pressure producing device and the tubes between the outlet of these tubes and the ports of the actuator cylinders form a unit permanently secured to the suspending cables. The construction is such that the keepers of the hooks may be simultaneously moved to released position by operation of the fluid pressure producing device to thereby release the curved members of the hooks from the boat. Furthermore, if desired, the keepers may be separately or independently released by manually operating the same through their hand grips.

As illustrated in Figures 5 to 9, inclusive, the hooks are inverted and permanently secured to the boat and detachably secured to the cables and the fluid pressure producing device is permanently secured to the boat. More particularly, 49 are cables which are permanently secured to the eye members 50 adapted to extend through the eyes of the hooks when the curved members 2 are in operative position. The hole in the opposite end of the hook receives the pin 51 which extends through the plates 52 in the stems of the boat and between which the hook frames 1 extend. The fluid pressure producing device 53 is built in the same manner as the fluid pressure producing device 41 and has its supporting flange secured to the plate 54 which preferably is secured to the gunwale 55 and a seat 56 of the boat. The manually operable handle 57 for moving the piston of the fluid pressure producing device is suitably mounted as by means of the bracket 58 upon the boat and the tubes 59 and 60 leading from the outlet of the fluid pressure producing device to the ports of the actuator cylinders are protected by the boat gunwale.

What I claim as my invention is:

1. A releasing gear hook comprising substantially parallel spaced frame members, a curved member pivoted between said frame members and movable to closed and open positions and cooperating with said frame members when in closed position to form an eye, a keeper having a bolt movable transversely of one of said frame members to hold said curved member in closed position, a spring member for resiliently engaging said keeper in holding position, and a fluid pressure operated actuator on said last mentioned frame member having a piston provided with means engageable with said keeper bolt to move said keeper to releasing position.

2. A hook for detachably suspending a load comprising a frame, a member pivoted to said frame and movable to closed and open positions, said pivoted member in closed position cooperating with said frame to form an eye, a keeper movable transversely of said frame to hold said pivoted member in closed position, a fluid pressure operated actuator on said frame having a cylinder and a piston slidable within said cylinder and provided with means engageable with said keeper to move the same to releasing position, and a spring member housed within said cylinder for resiliently engaging said keeper in closed position.

3. A hook for detachably suspending a load comprising a frame, a member pivoted to said frame and movable to closed and open positions, said pivoted member in closed position cooperating with said frame to form an eye, a keeper movable transversely of said frame to hold said pivoted member in closed position, a fluid pressure operated actuator having a cylinder secured to said frame and a piston slidable within said cylinder and provided with means in substantial alignment with said keeper for moving said keeper to releasing position, and a spring member housed within said cylinder for resiliently holding said keeper in closed position.

4. A hook for detachably suspending a load comprising a frame, a member pivoted to said frame and movable to closed and opened positions and cooperating with said frame when in closed position to form an eye, a keeper having a bolt movable transversely of said frame to a position for holding said pivoted member in closed position, a detent for engaging said bolt in said position and a fluid pressure operated actuator on said frame having a piston provided with means engageable with said bolt to move said keeper to releasing position.

5. A hook for detachably suspending a load comprising a frame, a member pivoted to said frame and movable to closed and opened positions and cooperating with said frame when in closed position to form an eye, a keeper having a bolt movable transversely of said frame to hold said pivoted member in closed position and a fluid pressure operated actuator on said frame having a cylinder and a piston slidable within said cylinder and provided with means engageable with said bolt to move said keeper to releasing position.

WILLIAM ROBERT MacCLUNEY.

REFERENCES CITED

The following references are of record in the file of this patent:

UNITED STATES PATENTS

| Number | Name | Date |
|---|---|---|
| 105,931 | Foster | Aug. 2, 1870 |
| 1,210,530 | Phillips et al. | Jan. 2, 1917 |
| 1,324,956 | Coulter | Dec. 16, 1919 |
| 1,381,405 | Dunham | June 14, 1921 |
| 1,383,252 | Wearham | June 28, 1921 |
| 1,675,896 | Lyda | July 3, 1928 |
| 1,796,648 | Fennema | Mar. 17, 1931 |
| 1,894,298 | Sutton et al. | Jan. 17, 1933 |
| 2,328,341 | Higgins et al. | Aug. 31, 1943 |